United States Patent
Espinasse

(10) Patent No.: US 8,960,299 B2
(45) Date of Patent: Feb. 24, 2015

(54) METHOD FOR DISCONNECTING A DEVICE FOR TRANSFERRING FLUID BETWEEN THE BOTTOM OF AN EXPANSE OF WATER AND THE SURFACE, AND ASSOCIATED TRANSFER DEVICE

(75) Inventor: Philippe Espinasse, Bihorel (FR)

(73) Assignee: Technip France (FR)

( * ) Notice: Subject to any disclaimer, the term of this patent is extended or adjusted under 35 U.S.C. 154(b) by 695 days.

(21) Appl. No.: 13/142,616

(22) PCT Filed: Dec. 29, 2009

(86) PCT No.: PCT/FR2009/052712
§ 371 (c)(1),
(2), (4) Date: Sep. 20, 2011

(87) PCT Pub. No.: WO2010/076535
PCT Pub. Date: Jul. 8, 2010

(65) Prior Publication Data
US 2012/0012331 A1    Jan. 19, 2012

(30) Foreign Application Priority Data

Dec. 29, 2008   (FR) ..................................... 08 59092
Mar. 25, 2009   (FR) ..................................... 09 51933

(51) Int. Cl.
*E21B 7/12*   (2006.01)
*F16L 27/00*   (2006.01)
(Continued)

(52) U.S. Cl.
CPC .............. *F16L 27/00* (2013.01); *B63B 22/021* (2013.01); *E21B 43/0107* (2013.01)
USPC ............ 166/338; 166/340; 166/352; 166/365

(58) Field of Classification Search
CPC ...... E21B 41/0071; B63B 22/06; B63B 22/02

USPC .............. 166/338, 340, 352, 365; 405/224.2; 441/3–5
See application file for complete search history.

(56) References Cited

U.S. PATENT DOCUMENTS 3,477,746 A * 11/1969 Watson .......................... 285/119
4,067,202 A *  1/1978 Reed ........................... 405/224.2
(Continued)

FOREIGN PATENT DOCUMENTS

| EP | 0186969 A | 7/1986 |
| FR | 2578024 A | 8/1986 |
| WO | WO 02/092423 A | 11/2002 |

OTHER PUBLICATIONS

International Search Report dated Jan. 17, 2011, issued in corresponding international application No. PCT/FR2009/052712.

(Continued)

*Primary Examiner* — Matthew Buck
*Assistant Examiner* — Aaron Lembo
(74) *Attorney, Agent, or Firm* — Ostrolenk Faber LLP

(57) ABSTRACT

A device including a fluid transport pipe (24), a superstructure (16), and a floating barge (18) rotatably mounted on the superstructure (16) about an axis of rotation (A-A'). The pipe (24) includes a hose section (150) wound around the axis of rotation (A-A') supported by an intermediate structure (20) mounted between the superstructure (16) and the barge (18), between a configuration rotatably driven with the barge (18) about the axis of rotation and a configuration rotatably retained about the axis of rotation (A-A') by the superstructure (16). During a step of connecting the pipe (24), the intermediate structure (20) is placed in either the driven configuration or the retained configuration, a step of disconnecting the pipe (24) including switching the intermediate structure (20) to the other one of the driven configuration and the retained configuration.

16 Claims, 11 Drawing Sheets

(51) Int. Cl.
*B63B 22/02* (2006.01)
*E21B 43/01* (2006.01)

(56) References Cited

U.S. PATENT DOCUMENTS

| | | | |
|---|---|---|---|
| 4,436,048 A * | 3/1984 | Gentry et al. | 114/230.12 |
| 4,478,586 A * | 10/1984 | Gentry et al. | 441/4 |
| 4,597,595 A | 7/1986 | Wallace | |
| 4,637,335 A * | 1/1987 | Pollack | 114/230.12 |
| 4,915,416 A | 4/1990 | Barrett et al. | |
| 4,998,899 A * | 3/1991 | Wood et al. | 441/3 |
| 5,755,607 A * | 5/1998 | Boatman et al. | 441/5 |
| 5,823,837 A * | 10/1998 | Boatman et al. | 441/5 |
| 5,893,334 A * | 4/1999 | Poranski, Sr. | 114/230.12 |
| 5,927,224 A * | 7/1999 | Etheridge et al. | 114/230.1 |
| 6,338,505 B1 * | 1/2002 | Korsgaard | 285/119 |
| 6,543,376 B1 * | 4/2003 | Breivik et al. | 114/230.12 |
| 7,172,479 B2 * | 2/2007 | Poldervaart et al. | 441/5 |
| 2012/0037265 A1 * | 2/2012 | Bodanese et al. | 141/1 |

OTHER PUBLICATIONS

French Search Report dated Jul. 30, 2009, issued in corresponding French priority application No. FR 0859092.

* cited by examiner

METHOD FOR DISCONNECTING A DEVICE FOR TRANSFERRING FLUID BETWEEN THE BOTTOM OF AN EXPANSE OF WATER AND THE SURFACE, AND ASSOCIATED TRANSFER DEVICE

CROSS-REFERENCE TO RELATED APPLICATIONS

The present application is a 35 U.S.C. §§371 national phase conversion of PCT/FR2009/052712, filed Dec. 29, 2009, which claims priority of French Application No. 0859092, filed Dec. 29, 2008, and French Application No. 0951933, filed Mar. 25, 2009, the contents of which are incorporated by reference herein. The PCT International Application was published in the French language.

The present invention relates to a method for disconnecting a device for transferring fluid between the bottom of an expanse of water and the surface, the transfer device including:
- at least one fluid transport pipe including a lower section, an intermediate section, an upper section, and a quick disconnect member inserted between the intermediate section and either the lower section or the upper section;
- a superstructure supporting the lower section, the superstructure comprising a means for anchoring in the bottom of the expanse of water;
- a floating barge rotatably mounted on the superstructure around an axis of rotation, the barge supporting the upper section, the intermediate section comprising at least one flexible hose section wound around the axis of rotation, the method including a connecting step in which the intermediate section is connected to either the lower section or the upper section via the quick disconnect member, and a disconnection step including the disconnection of the quick disconnect member.

Such a fluid transfer assembly is intended in particular to convey liquid or gaseous hydrocarbons connected in the bottom of an expanse of water to bring them to the surface for storage and/or unloading thereof.

To perform such a transfer, it is known to use a device comprising a plurality of risers, which extend between the wellheads situated on the bottom of the expanse of water and a surface installation. These risers are rigid or flexible.

The surface installation is for example a hydrocarbon production, liquefaction, storage, and offloading barge, called a "Floating Production Storage and Off-loading Unit" or "FPSO."

Such a transfer assembly is sometimes mounted in areas where the climate conditions can deteriorate seriously, and where the movements of the expanse of water in the vicinity of the barge can be strong, in particular due to wind and currents. Therefore, the surface installation comprises, in a known manner, a superstructure that is stationary relative to the bottom of the expanse of water. The stationary superstructure is rotatably received in a well formed at an end or the center of the barge. The barge is then free to pivot around the superstructure to be oriented favorably relative to the local movements of the expanse of water and the forces applied to it.

The fluid transport pipe then comprises a lower section that connects the bottom of the expanse of water to the superstructure, an intermediate section that extends between the superstructure and the barge, and an upper section that extends over the barge. The lower section then passes through the inside of the superstructure.

Given the rotary connection between the barge and the superstructure, the intermediate section for example comprises a swing joint, or more advantageously a section of flexible hose wound in a loop around the axis of rotation of the barge relative to the superstructure.

This flexible hose section winds and unwinds around the axis of rotation to accommodate the differences in angular position between the stationary superstructure and the rotary barge.

However, in case of truly bad climate conditions, the transfer device must be made safe by completely freeing the barge in rotation relative to the superstructure. This involves disconnecting the flexible pipe to prevent the intermediate segment from being destroyed.

To that end, known from U.S. Pat. No. 4,915,416 is a disconnection method of the aforementioned type, wherein the lower section of the transfer pipe is disconnected from a rotary drum relative to the barge and is lowered using a winch before being abandoned.

However, in such a method, it becomes very difficult to recover the lower section of the flexible pipe after it is dropped.

SUMMARY OF THE INVENTION

One aim of the invention is therefore to obtain a method for disconnecting a transfer device that comprises an intermediate section with a wound flexible hose section, the disconnection being able to be implemented quickly and safely, while offering a fast reconnection of the transfer pipe after the disconnection.

To that end, the invention relates to a method of the aforementioned type, characterized in that the transfer device comprises at least one intermediate structure for at least partial support of the wound flexible hose section, the intermediate structure being mounted between the superstructure and the barge, between a configuration driven in joint rotation with the barge around the axis of rotation relative to the superstructure and a configuration retained in rotation around the axis of the rotation by the superstructure, and, during the connection step, the intermediate structure is placed in either the driven configuration or the retained configuration, the disconnection step comprising the passage of the intermediate structure towards the other of the driven configuration and the retained configuration.

The method according to the invention can comprise one or more of the following features, considered alone or according to all technically possible combinations:
- the intermediate structure comprises a wall for supporting the wound hose section extending around the axis of rotation, the connection step comprising the winding and/or unwinding of the wound hose section on the support wall around the axis of rotation during the rotation of the barge relative to the superstructure;
- the disconnection step comprises the translation of the intermediate structure along the axis of rotation to make the intermediate structure go from one of its driven configuration and its retained configuration towards the other of said driven configuration and retained configuration;
- during the connection step, the intermediate structure is in its retained configuration;
- during the connection step, the intermediate structure is in its driven configuration;
- after the disconnection step, the barge is mounted freely rotating around the superstructure, the ends of the wound hose section remaining substantially angularly fixed relative to each other around the axis of rotation.

The invention also relates to a device for transferring fluid between the bottom of an expanse of water and the surface of the type comprising:

at least one fluid transport pipe including a lower section, an intermediate section, an upper section, and a quick disconnect member inserted between the intermediate section and either the lower section or the upper section, a superstructure supporting the lower section, the superstructure comprising a means for anchoring in the bottom of the expanse of water;

a floating barge, rotatably mounted on the superstructure around an axis of rotation, the barge supporting the upper section, the intermediate section comprising at least one hose section wound around the axis of rotation, the transport pipe being able to occupy a connected configuration in which the intermediate section is connected to either the lower section or the upper section via the quick disconnect member, and a disconnection configuration of the quick disconnect member, characterized in that the transfer assembly comprises an intermediate structure for at least partially supporting the wound hose section, the intermediate structure being mounted between the superstructure and the barge, between a configuration driven in joint rotation with the barge around the axis of rotation relative to the superstructure and a configuration retained in rotation around the axis of rotation by the superstructure.

The transfer device according to the invention can comprise one or more of the following features, considered alone or according to all technically possible combinations:

the intermediate structure comprises a wall for supporting the wound flexible hose section extending around the axis of rotation, the wound hose section being at least partially arranged on the support wall;

the device comprises a plurality of fluid transport pipes, the intermediate structure comprising a wall for supporting the wound flexible hose section of each transport pipe, the support walls being arranged one above the other along the axis of rotation;

in the connected configuration of the pipe, the intermediate structure occupies its driven configuration;

in the connected configuration of the pipe, the intermediate structure occupies its retained configuration;

the assembly comprises a device for adjusting the angular position of the intermediate structure relative to the superstructure in the retained configuration;

in a first of the driven configuration and the retained configuration, the ends of the wound flexible hose section are angularly mobile relative to each other around the axis of rotation when the barge rotates around the superstructure, and in a second of the driven configuration and the retained configuration, the ends of the wound flexible hose section remain substantially angularly fixed relative to each other around the axis of rotation during rotation of the barge around the superstructure; and the assembly comprises an intermediate structure for at least partially supporting a wound flexible hose section of an additional transport pipe, the additional intermediate structure being mounted between the superstructure and the barge, between a configuration driven in joint rotation with the barge around the axis of rotation and a configuration retained in rotation around the axis of rotation by the superstructure, the intermediate structure being arranged outside the superstructure, the additional intermediate structure being arranged in the superstructure;

the intermediate structure is arranged substantially above the superstructure and the barge;

the intermediate structure is arranged substantially between the superstructure and the barge, outside the superstructure;

the intermediate structure is arranged substantially in the superstructure;

the intermediate structure is translationally mobile along the axis of rotation between its driven configuration and its retained configuration.

The invention will be better understood upon reading the following description, provided solely as an example, and done in reference to the appended drawings, in which:

DESCRIPTION OF EMBODIMENTS

In the rest of the document, the terms "upstream" and "downstream" are used relative to a normal direction of circulation of a fluid in a pipe.

A first fluid transfer device 10 according to the invention is illustrated by FIGS. 1 to 4.

This assembly 10 is for example intended to convey a fluid formed by liquid or gaseous hydrocarbons taken from the bottom of an expanse of water and collected in a bottom device (not shown).

Figure 1:
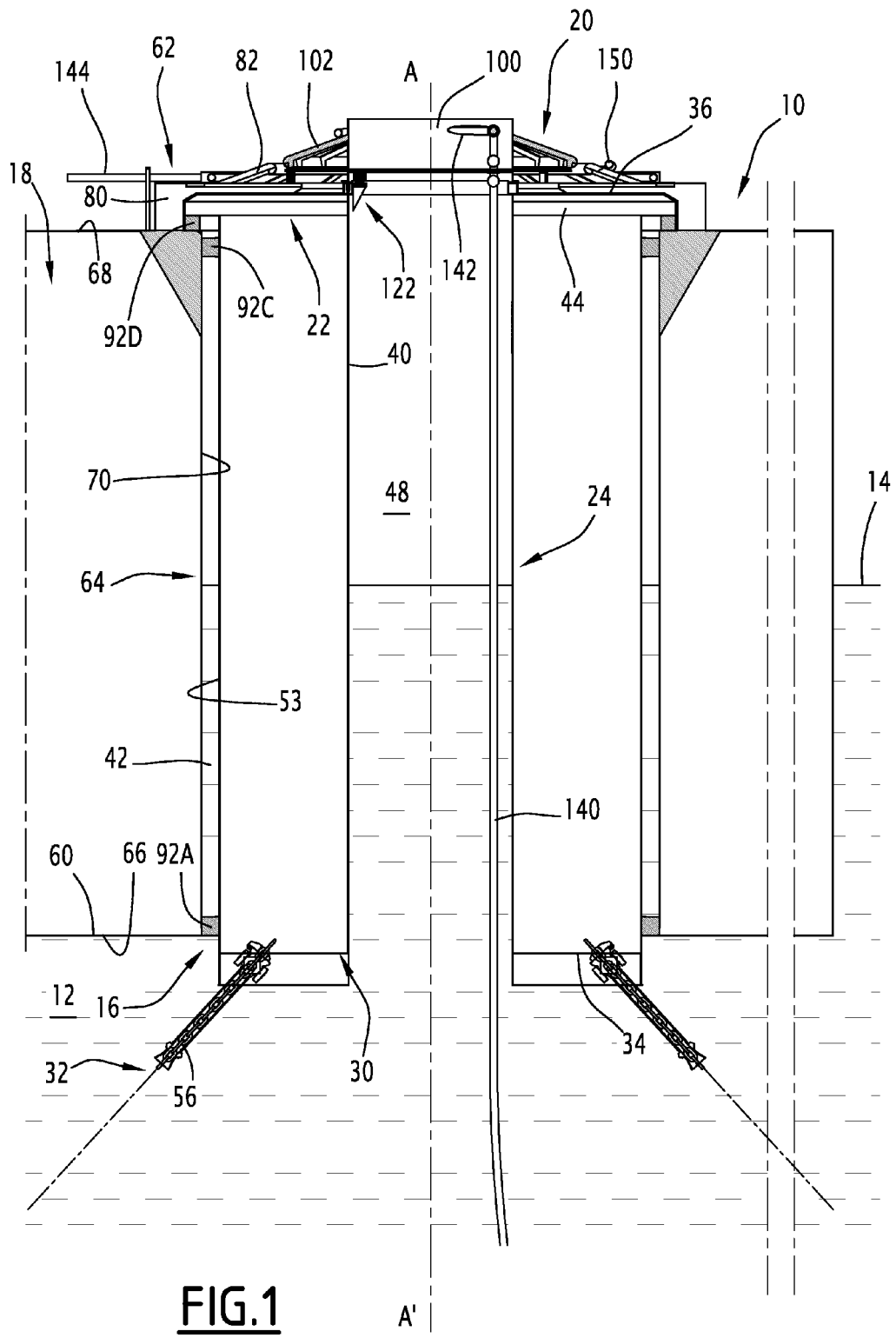
FIG. 1 is a schematic cross-sectional view along a vertical middle plane of a first transfer device according to the invention in a connected configuration of the fluid transport pipe.

The fluid conveyed by the installation is brought through the expanse of water 12 up to the surface 14 shown in FIG. 1.

The expanse of water 12 is for example a lake, a sea or an ocean. It rests on a bottom and has a depth, between the surface 14 and the bottom, for example between 100 m and 3500 m.

As illustrated in FIG. 1, the transfer device 10 comprises a superstructure 16 anchored in the bottom of the expanse of water 12, a barge 18 rotatably mounted around the superstructure 16 around a vertical axis of rotation A-A', and an intermediate structure 20 mounted between the barge 18 and the superstructure 16 to be selectively driven in rotation by the barge 18 and retained by the superstructure 16.

The device 10 also comprises a means 22 for rotating and translating the intermediate structure 20 relative to the superstructure 16 and the barge 18, and a plurality of fluid transport pipes 24 to connect the bottom device to the barge 18 through the superstructure 16 and the intermediate structure 20. To simplify the drawing, only one pipe 24 is shown in FIG. 1.

Figure 2:
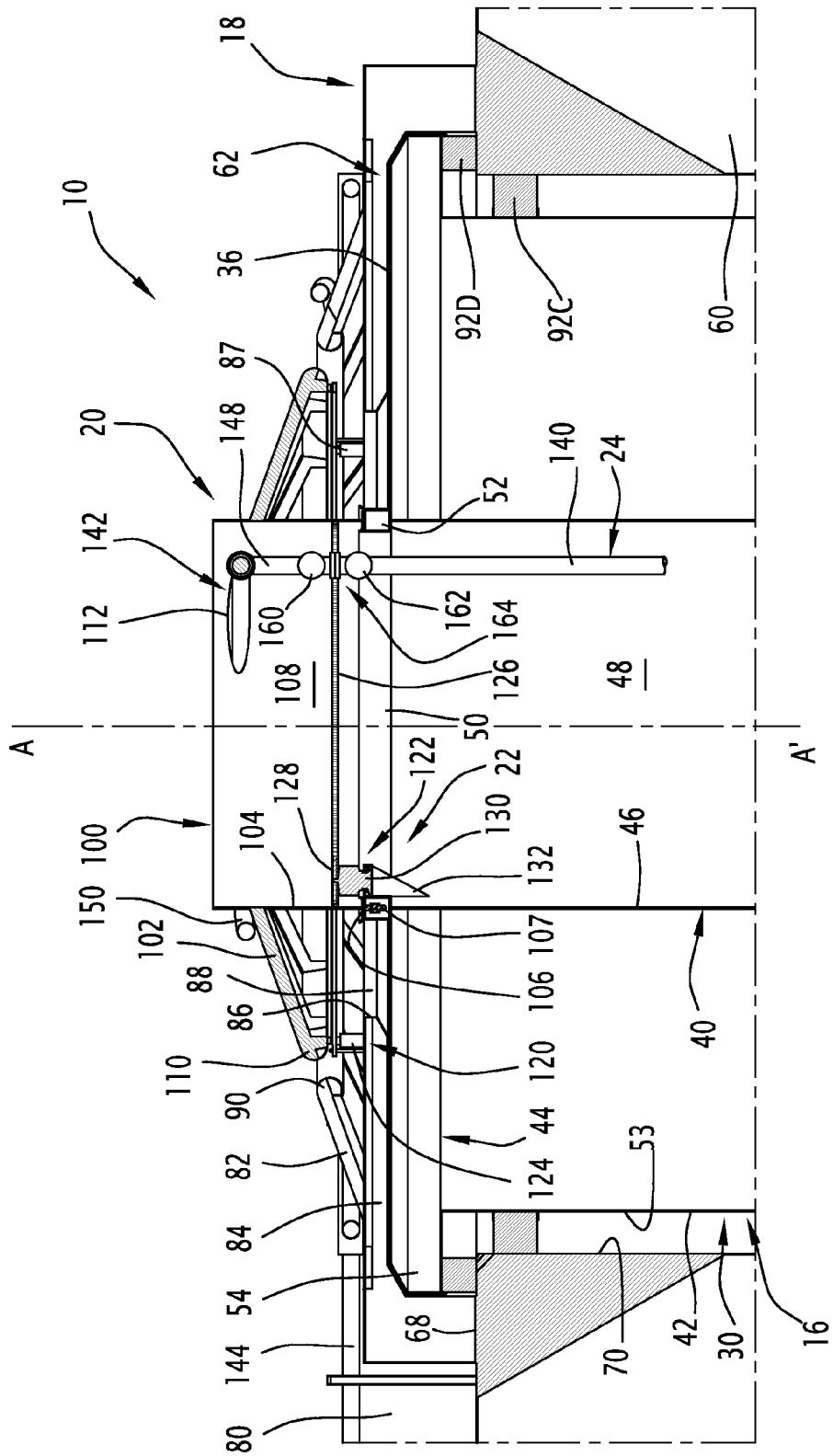
FIG. 2 is a larger scale view of a detail of the transfer device shown in FIG. 1, illustrating the connection between the superstructure and the floating barge.

In reference to FIGS. 1 and 2, the superstructure 16 comprises a cylindrical body 30 and a means 32 for anchoring the body 30 in the bottom of the expanse of water.

The body 30 has a vertical axis A-A'. It extends between a lower surface 34 situated opposite and spaced away from the bottom of the expanse of water 12 and an upper surface 36 situated above the surface 14 of the expanse of water 12.

The body 30 comprises an inner central sleeve 40, an outer annular sleeve 42 arranged around the inner sleeve 40, and a skirt 44 for guiding the rotation of the barge 18 around the body 30, which covers the outer annular sleeve 42 towards the top.

The sleeve 40 comprises a peripheral wall 46 that inwardly delimits a passage 48 in which the pipe 24 passes.

The peripheral wall 46 comprises, along its upper edge, a guide and bearing rail 50 of the intermediate structure 20.

The rail 50 is formed by an annular profile emerging upwards through a slotted bearing wall 52. The rail 50 extends over the entire periphery around the axis A-A'.

The circulation passage 48 emerges axially upwards opposite the intermediate structure 20 and axially downwards in the expanse of water 12.

The skirt 44 upwardly covers the outer annular sleeve 42. It extends inwardly near the axis of rotation A-A', below the guide rail 50. The skirt 44 defines an outer edge 54 that protrudes radially spaced away from the axis of rotation A-A' beyond the outer annular sleeve 42 and reacts the main efforts.

The outer annular sleeve 42 has a substantially cylindrical outer peripheral surface 53 for guiding the rotation of the barge 18 around the superstructure 16.

The anchoring means 32 is separate from the or each transport pipe 24.

It comprises flexible lines 56 having an upper end fixed on the superstructure 16, and a lower end fixed in the bottom of the expanse of water by an anchor member, such as a pile or a suction anchor, for example.

The flexible lines 56 keep the superstructure 16 substantially horizontally immobile relative to the bottom of the expanse of water, while offering a certain vertical flexibility. Moreover, the lines 56 keep the superstructure 16 substantially stationary in rotation around the axis A-A'.

The barge 18 comprises a floating hull 60, a support 62 for temporarily receiving, in the disconnected mode, the intermediate structure 20, and a means 64 for guiding the rotation of the barge 18 around the axis of rotation A-A'.

The hull 60 has a height, between its lower surface 66 and its upper surface 68, substantially equal to the height of the superstructure 16. The hull 60 defines a well 70 with axis A-A' for receiving the superstructure 16.

In the example shown in the Figures, the well 70 is situated substantially at the center of the barge 18. Alternatively, it is situated at one end of the barge 18. It emerges axially upwards and downwards.

The well 70 has a substantially cylindrical transverse section with a diameter slightly larger than the outside diameter of the outer annular sleeve 42, as defined by the outer surface 53, in order to allow a means 64 for rotational guiding to be inserted. The well 70 receives the superstructure 16.

The receiving support 62 comprises an annular cap 80 and a tapered outer wall 82 for at least partially supporting the transport pipe 24.

The cap 80 is attached on the upper surface 68 around the well 70. It has a horizontal annular wall 84 that protrudes inwardly towards the axis A-A" opposite the well 70, above the skirt 44.

The upper wall 84 supports, near an inner annular edge 86, an annular support ring 87 for a means for lifting the intermediate structure 20, as will be seen below.

The upper wall 84 delimits, inside the inner annular edge 86, a passage opening 88 for the intermediate structure 20, extending inside the rail 52.

The outer tapered wall 82 protrudes upwards from the upper wall 84. It forms, in an axial plane passing through the axis A-A', an angle larger than 10° with the horizontal. It extends over the entire periphery of the upper wall 84 around the axis A-A'.

The rotational guiding means 64 comprises bearings 92A, 92C secured to the hull 60. The bearings 92A, 92C are inserted into the annular space defined between the annular sleeve 42 and the hull 18 in the well 70, near the lower edge 66 and the upper edge 68, respectively.

Furthermore, the rotational guiding means 64 comprises a support bearing 92D inserted between the upper surface 68 and the outer edge 54 of the skirt 44, below the cap 80.

Thus, the floating barge 18 is rotatably mounted around the superstructure 16, around the axis of rotation A-A'.

The floating barge 18 is thus free to orient itself angularly around the axis of rotation A-A' as a function of the current and wind applied to it, in order to adopt the most stable angular position. Alternatively, it can be directed to orient itself angularly along a given angle around the axis A-A'.

In the example shown in FIGS. 1 to 4, the intermediate structure 20 is arranged above the superstructure 16 and the floating barge 18, outside the well 70.

The intermediate structure 20 covers the well 70 towards the top. It comprises a central rotary drum 100 with axis A-A' and a tapered inner support wall 102 that protrudes radially downwards from the rotary drum 100.

The drum 100 has a diameter defined by the curve radius allowed for the intermediate transfer hose. It comprises a cylindrical wall 104 having an annular support leg 106 intended to bear on the horizontal support wall 52 in the opening 88.

The cylindrical wall 104 protrudes upwards above the upper surface 36 and above the cap 84. It delimits an inner passage 108 that emerges downwards in the inner passage 48 of the sleeve 40.

The annular leg 106 supports at least one roller 107 rolling in the rail 50, able to be deployed downwards through the slotted support wall 52 between a retracted position, placed away from the bottom of the rail 50, and a deployed rolling position in contact with the bottom of the rail 50.

The inner tapered wall 102 extends radially spaced away from the axis A-A', in the inner extension of the outer tapered wall 82, up to a free annular edge 110 that extends opposite the outer angular edge 90 of the outer tapered wall 82. It extends over the entire periphery of the cylindrical wall 104 around the axis A-A'.

The outer annular edge 110 also extends above and opposite the bearing ring 87.

In an axial plane passing through the axis A-A', the angle defined by the inner tapered wall 102 and a horizontal plane is substantially equal to the angle defined by the tapered outer wall 82 and a horizontal plane.

The cylindrical wall 104 also delimits a radial opening 112 for passage of the pipe, which emerges outwardly above the tapered wall 102.

As will be seen in more detail below, the intermediate structure 20 can be translated along the axis A-A' between a lower configuration retained by the superstructure 16, in which it is secured in rotation to the superstructure 16, and in which the barge 18 can be rotated around the assembly formed by the superstructure 16 and the intermediate structure 20, and an upper configuration driven by the barge 18, in which the intermediate structure 20 is driven in rotation jointly with the barge 18 around the axis of rotation A-A' relative to the superstructure 16.

Moreover, in the retained configuration, the relative angular position of the intermediate structure 20 relative to the superstructure 16 can be adjusted via a displacement means 22, as will be shown below.

The displacement means 22 comprises a device 120 for translating the intermediate structure 20 along the axis A-A' relative to the superstructure 16 and relative to the barge 18, and a device 122 for adjusting the angular position of the intermediate structure 20 relative to the superstructure 16, when the intermediate structure 20 is in its retained configuration.

The device 120 for moving in translation comprises a plurality of jacks 124 mounted on the cap 80 near the outer edge 86, under the inner tapered wall 102.

The jacks 124 are able to lift the inner tapered wall 102 and subsequently, the intermediate structure 20, to move the structure 20 between the retained configuration and the driven configuration.

The rotational movement device 122 comprises an inner toothed crown 126, secured to the cylindrical wall 104 in the passage 108, a rotary pinion 128 able to mesh on the crown 126 in the retained configuration, and a motor 130 for driving the rotary pinion 128 mounted on a support 132 secured to the inner sleeve 40 in the passage 48.

In the retained configuration, the annular support leg 106 is placed on the upper support wall 52 above the guide rail 50.

The inner tapered wall 102 is then slidingly mounted on the ring 87. The pinion 128 is disengaged from the crown 126. The angular position of the superstructure 16 relative to the intermediate structure 20 is then kept in contact with the leg 106 and the wall 52 by the bearing surfaces.

Furthermore, the steering of the motor 130 in the retained configuration makes it possible, after engaging the pinion 128 in the crown 126, to adjust the angular position around the axis A-A' of the intermediate structure 20 relative to the superstructure 16.

In the driven configuration, the jacks 124 have been deployed upwards to lift the intermediate structure 20 away from the superstructure 16.

The annular support leg 106 is then arranged above and spaced away from the support leg 52 and the toothed crown 126 is arranged above and spaced away from the pinion 128.

In this driven configuration, the intermediate structure 20 rests via jacks 124 on the barge 18 and is driven in rotation jointly with the barge 18 around the superstructure 16.

The transport pipe 24 comprises a lower section 140, supported by the superstructure 16, an intermediate section 142 at least partially supported by the intermediate structure 20, and an upper section 144 supported by the barge 18.

The pipe 24 also comprises a quick disconnect device 146 inserted in this example between the intermediate section 142 and the lower section 140.

The lower section 140 is for example made with a base of at least one part made from hose. "Hose" within the meaning of this application refers to a pipe as defined for example in normative documents API 17J by the American Petroleum Institute. Such a hose can be wound on a placement drum, without significant plastic deformation.

The lower section 140 extends substantially vertically between a lower end situated on the bottom of the expanse of water and an upper end situated in the inner passage 48 and connected to the emergency disconnect device 146.

The intermediate section 142 comprises a bent rigid connector 148 mounted secured to the cylindrical wall 104 in the passage 108 and a section 150 of hose wound around the axis A-A' and positioned bearing on the inner tapered wall 102 and on the outer tapered wall 82.

Figure 3:
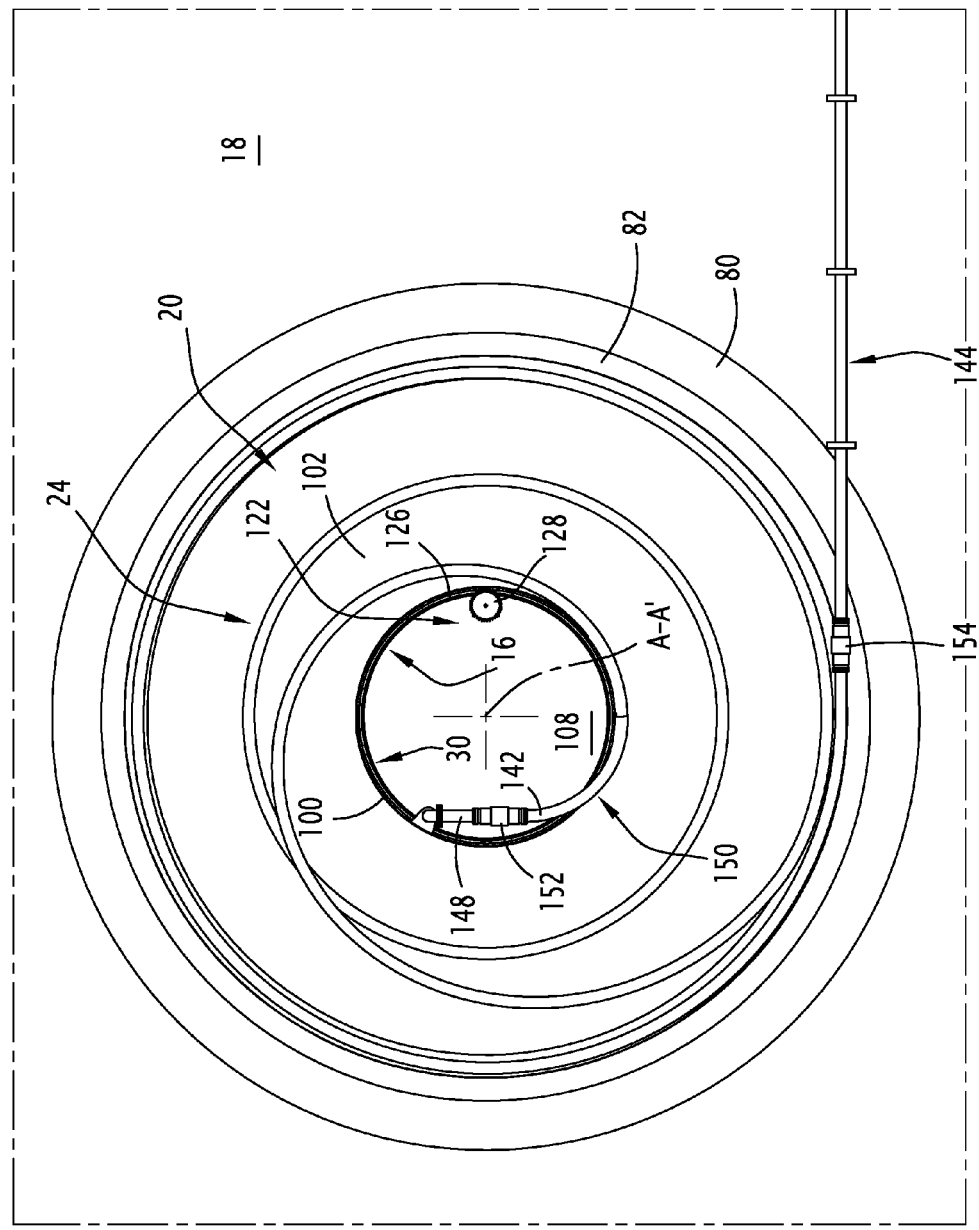
FIG. 3 is a top view of FIG. 2.
Figure 4:
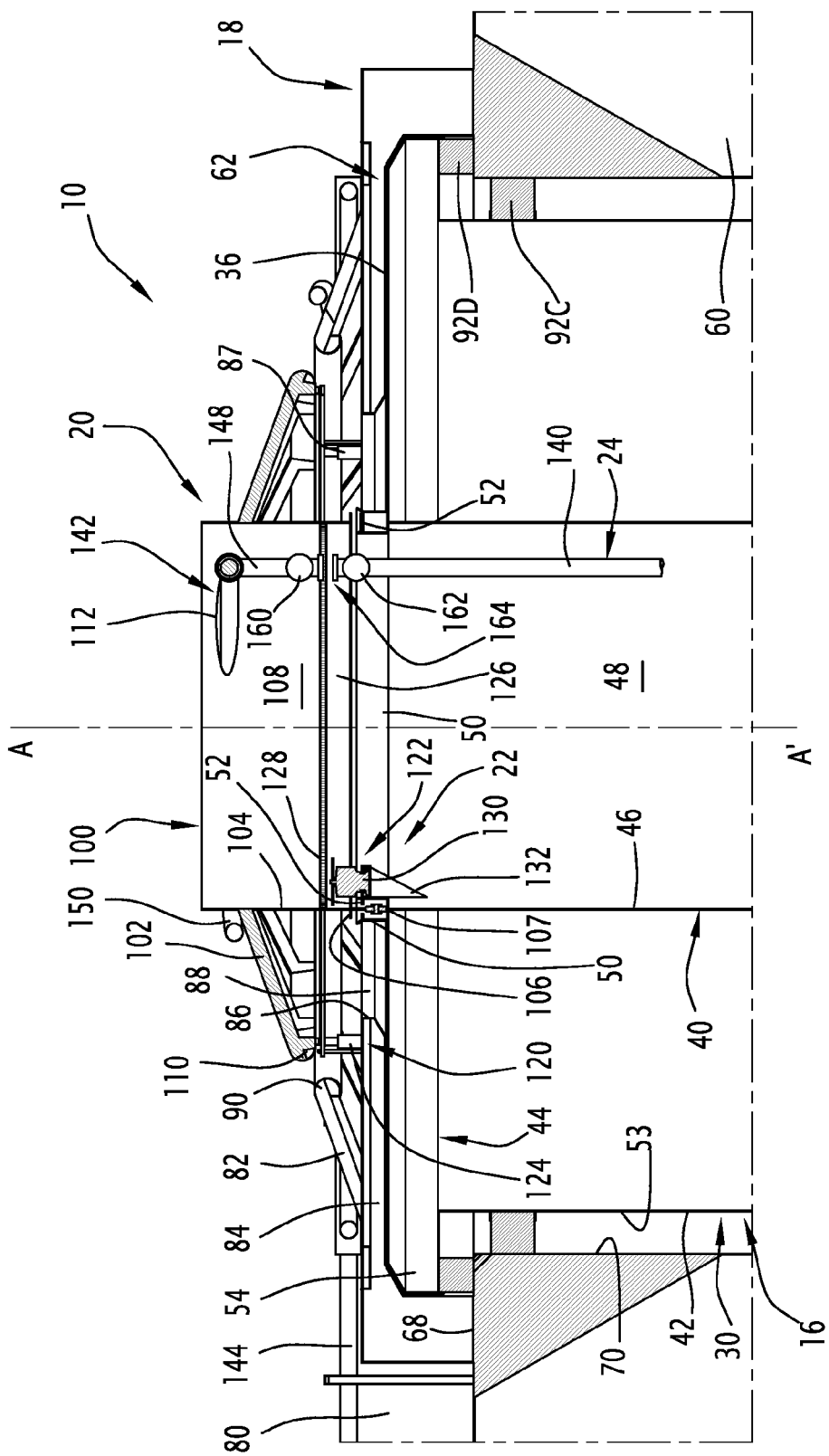
FIG. 4 is a view similar to FIG. 2, in a disconnected configuration of the transport pipe.
Figure 5:
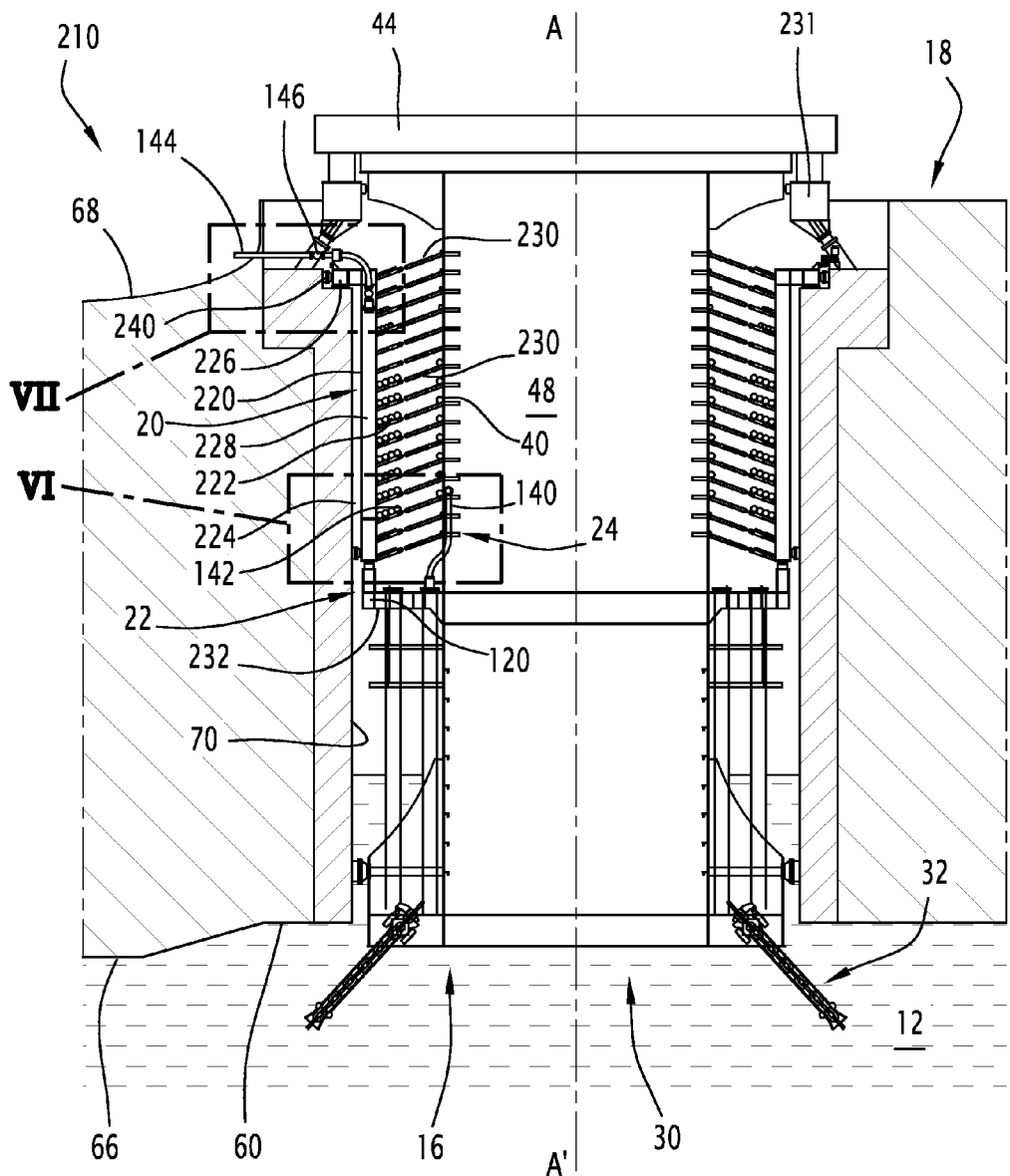
FIG. 5 is a view similar to FIG. 1 of a second transfer assembly according to the invention.

As illustrated by FIG. 3, the hose section 150 thus comprises an inner end 152 fixed on the rigid connector 148 in the passage 108 and an outer end 154 fixed on the upper section 144 opposite the barge 18.

Thus, the inner end 152 is secured in rotation with the intermediate structure 20, while the outer end 154 is secured in rotation with the barge 18.

As illustrated by FIG. 3, the hose section 150 forms, between its inner end 152 and its outer end 154, at least one loop around the axis A-A' whereof the length varies as a function of the relative angular position of the lower end 152 relative to the outer end 154 when the barge 18 rotates around the superstructure 16 when the intermediate structure is in its retained configuration.

In the example shown in FIG. 3, and in the adopted angular position, the hose section 150 forms three loops around the axis A-A'.

Thus, the hose section 150 is able to accommodate variations in the angular position of the barge 18 relative to the superstructure 16 over an angular range advantageously greater than or equal to 360°, without it being necessary to use a swing joint and without a risk of damaging the pipe 24.

The upper section 144 is supported by the barge 18 on a ramp above the upper surface 68. In this example it is formed by a rigid pipe.

In this example, the quick disconnect device 146 is placed in the passage 48 near the intermediate structure 20.

The device 146 comprises an upper isolating valve 160 secured to the upstream free end of the intermediate section 142, a lower isolating valve 162 secured to the downstream free end of the lower section 140 and a quick connector 164, which can be disconnected quickly in case of emergency. Such a connector is referred to as a "Quick Connect and Disconnect Connector" (QCDC).

The transport pipe 24 is thus able to occupy a connected configuration in which the intermediate section 142 is connected to the lower section 140 via the quick disconnect device 146, and a disconnected configuration of the quick disconnect device 146, in which the lower section 140 and the intermediate section 142 are disconnected.

A first disconnection method according to the invention in the transfer device 10 will now be described.

Initially, as illustrated by FIGS. 1 to 3, the transfer device 10 is connected to the bottom device to collect the hydrocarbons extracted from the bottom of the expanse of water.

To that end, the superstructure 16 is anchored in the bottom of the expanse of water 12 via anchoring lines 56. As specified above, the superstructure 16 is then substantially stationary in rotation around the axis A-A' relative to the bottom of the expanse of water 12.

The barge 18 is rotatably mounted around the superstructure 16 and is at least partially free to move angularly around the axis A-A' relative to the superstructure 16 as a function of the currents and wind applies to the barge 18. This rotation is guided by the bearings 92A to 92D.

The intermediate structure 20 occupies its configuration retained on the superstructure 16. To that end, as described above, the cylindrical wall 104 of the rotary drum 100 is arranged bearing on the rails 50 provided along the upper edge of the superstructure 16.

The intermediate structure 20 is kept fixed in rotation relative to the superstructure 16, by friction on the rail 50. The roller 107 is then in its retracted position.

The bearing ring 87 situated on the barge 18 slides under the lower tapered wall 102 when the barge 18 rotates around the superstructure 16 and the intermediate structure 20. The barge 18 is free to pivot around the superstructure 16 without driving the intermediate structure 20 in rotation around the axis of rotation A-A'.

The fluid transfer pipe 24 is then in its connected configuration.

Thus, the emergency disconnect device 146 is connected and the lower section 140 is connected to the intermediate section 142 via isolating valves 160, 162 and the quick connector 164.

A continuous passage of fluid is therefore defined successively from the bottom of the expanse of water 12 towards the surface through the lower section 140, the intermediate section 142, and the upper section 144.

When the barge 18 rotates around the superstructure 16, the outer end 154 of the wound hose section 150, stationary in rotation relative to the barge 18, moves angularly around the axis A-A' relative to the inner end 152 of the hose section 150 stationary in rotation relative to the superstructure 16.

The hose section 150 winds or unwinds accordingly, bearing on the tapered support walls 102, 82. This makes it possible to accommodate variations in the angular position of the barge 18 relative to the superstructure 16, while transporting fluid through the transport pipe 24.

When a disconnection is necessary, for example if the weather conditions deteriorate, the isolating valves 160, 162 are closed. The emergency connector 164 is disconnected to free the lower section 140 relative to the intermediate section 142.

The jack 124 of the translational movement device 120 is then activated to lift the intermediate structure 20 relative to the superstructure 16 along the axis A-A' and make it go from its retained configuration to its driven configuration.

The annular leg 106 rises away from and above the bearing wall 52.

The intermediate structure 20 is then driven in rotation around the axis A-A' by the floating barge 18. It is free to move in rotation around the axis A-A' relative to the superstructure 16.

In this configuration, the inner end 152 of the hose section 150 then moves jointly with the outer end 154 of said hose section, such that the rotation of the floating barge 18 around the axis A-A' does not affect the winding of the hose section 150 around the axis A-A'. Thus, the inner end 152 remains angularly fixed relative to the outer end 154.

In this way, the barge 18 can perform rotations with a very substantial angular reach around the superstructure 16, in particular greater than one revolution, or even greater than several revolutions, depending on the atmospheric conditions and the current.

The superstructure 16 remains substantially stationary relative to the bottom of the expanse of water 12 while being held by the anchoring means 32.

When the atmospheric conditions return to normal, it is then very easy to reconnect the installation.

To that end, the rollers 107 are deployed toward their rolling position to pick up the weight of the structure 20, then the jack 124 of the movement device 120 is moved to make the intermediate structure 20 go from its driven configuration to its retained configuration.

The pinion 128 then meshes on the crown 126, and the support leg 106 rests on the support wall 52.

Then, the motor 132 is activated to angularly align the free end of the intermediate section 142 provided with the valve 160 with the free end of the lower section 144 provided with the valve 162 and reconnect the connector 164. Then, the rollers 107 are retracted and the connection is done.

The inventive method therefore makes it possible to ensure a quick and safe disconnection of a transfer device 10, in case of extreme conditions, while allowing satisfactory normal operation during a free or steered rotation of the barge 18 relative to the superstructure 16 around the axis A-A', when the transport pipe 24 is connected to transport fluid between the bottom and the surface.

It is also simple to reconnect each transfer pipe 24 when the conditions are met to resume fluid production.

FIGS. 5 to 8 illustrate a second transfer device 210 according to the invention.

Unlike the first transfer device 10 shown in FIGS. 1 to 4, the intermediate structure 20 is arranged substantially completely in the annular space delimited between the superstructure 16 and the hull 60 in the well 70.

The intermediate structure 20 thus comprises a hollow outer cylindrical sleeve 220 and a plurality of outer tapered walls 222 supporting each intermediate section 142 of a pipe 24.

The outer sleeve 220 comprises a hollow cylindrical lower part 224 with axis A-A' and an outer bearing skirt 226 that protrudes radially outwards from the upper edge of the cylindrical lower part 224.

The lower part 224 delimits an annular inner space 228 for the passage of part of the intermediate section 144 of each pipe 24.

The outer tapered walls 222 are arranged one above the next along axis A-A'.

Each tapered wall 222 protrudes inwardly towards axis A-A' from the lower portion 224. Each wall 222 forms, projecting in an axial plane passing through the axis A-A', an angle larger than 10°.

Each tapered wall 222 is intended to support part of the wound hose section 150.

The superstructure 16 includes an inner cylindrical sleeve 40 extending opposite the hull 30. The inner sleeve 40 supports a plurality of inner tapered walls 230 extending opposite each outer tapered wall 222.

The superstructure 16 also comprises a bearing skirt 44 arranged above the sleeve 40 and protruding radially in relation to the sleeve 40. The bearing skirt 44 is rotatably mounted relative to the barge 18 on supports 231 secured to the barge and arranged around the well 70, with bearings inserted between the supports 231 and the skirt 44.

Furthermore, the superstructure 16 delimits, under the annular sleeve 220, a support surface 232 for the translational movement device 120. Thus, unlike the first device 10, the translational movement device 120 is supported by the superstructure 16.

The hull 60 of the barge 18 delimits a support shoulder 240 of the skirt 226 opening towards axis A-A'. The shoulder 240 is situated in the upper part of the well 70.

Figure 6:
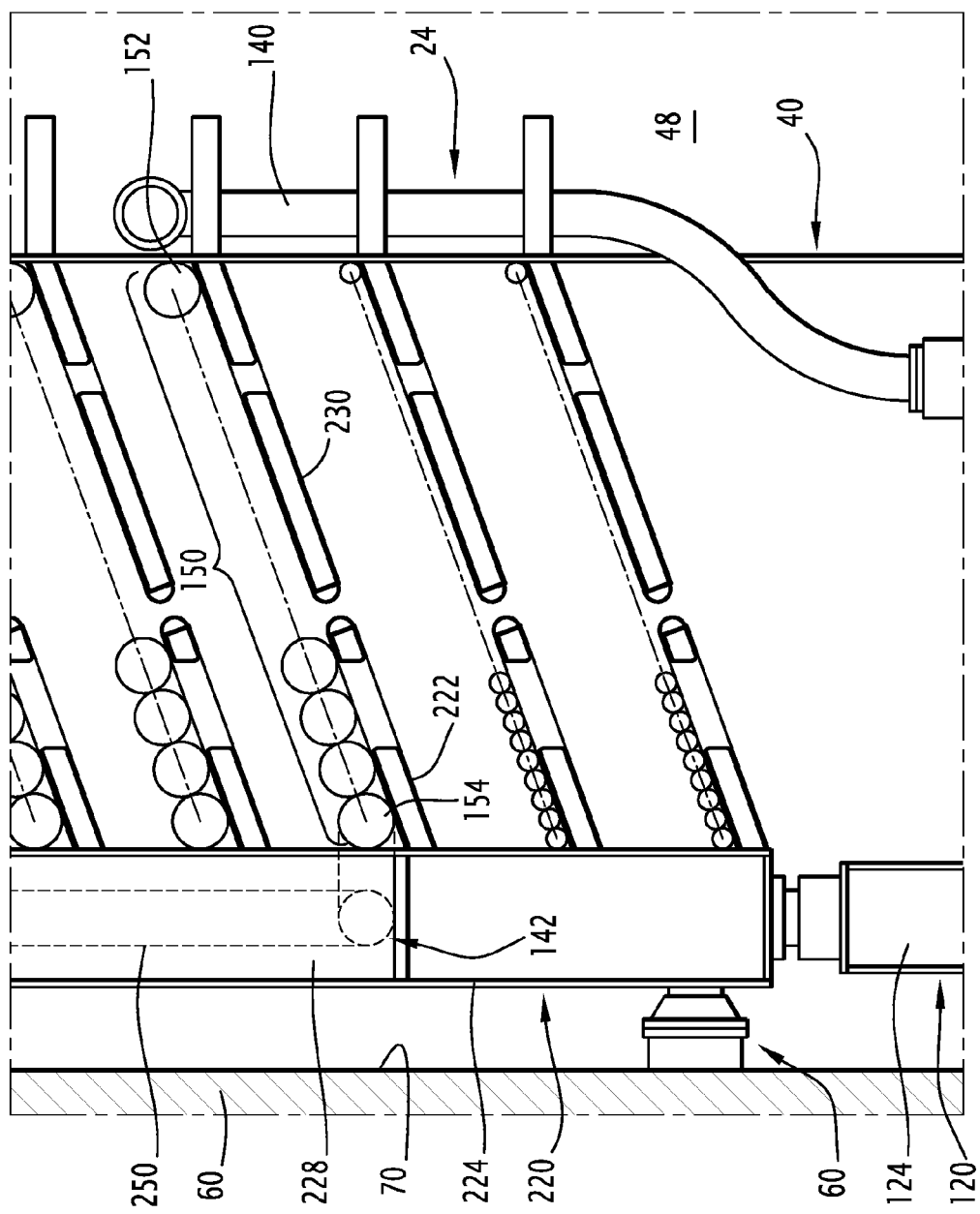
FIG. 6 is a detail view marked VI in FIG. 5.

In reference to FIG. 6, each lower section 140 of a transport pipe 24 extends to an axial position along the axis A-A' situated in the passage 48 opposite a tapered outer wall 230.

The inner end 152 of each intermediate section 142 is permanently connected to the lower section 140 through the inner sleeve 40 of the superstructure, without inserting a quick disconnect device.

Each intermediate section 142 comprises, as previously described, a wound hose section 150, which extends in the annular space defined by the well 70 between the inner sleeve 40 and the outer sleeve 220, bearing on the facing tapered walls 222, 230.

The outer end 154 of the hose section 150 is fastened on the outer sleeve 220. It is connected through the outer sleeve 220 to an upper part 250 of the intermediate section 142 that extends vertically through the annular space 228 to the skirt 226.

The upper parts 250 of the various intermediate sections 142 are distributed in the annular space 228 and angularly separated from each other around the axis A-A'.

Furthermore, unlike the transfer device 10, the disconnection device 146 of the second transfer device 210 is inserted between the intermediate section 142 and the upper section 144.

Figure 7:
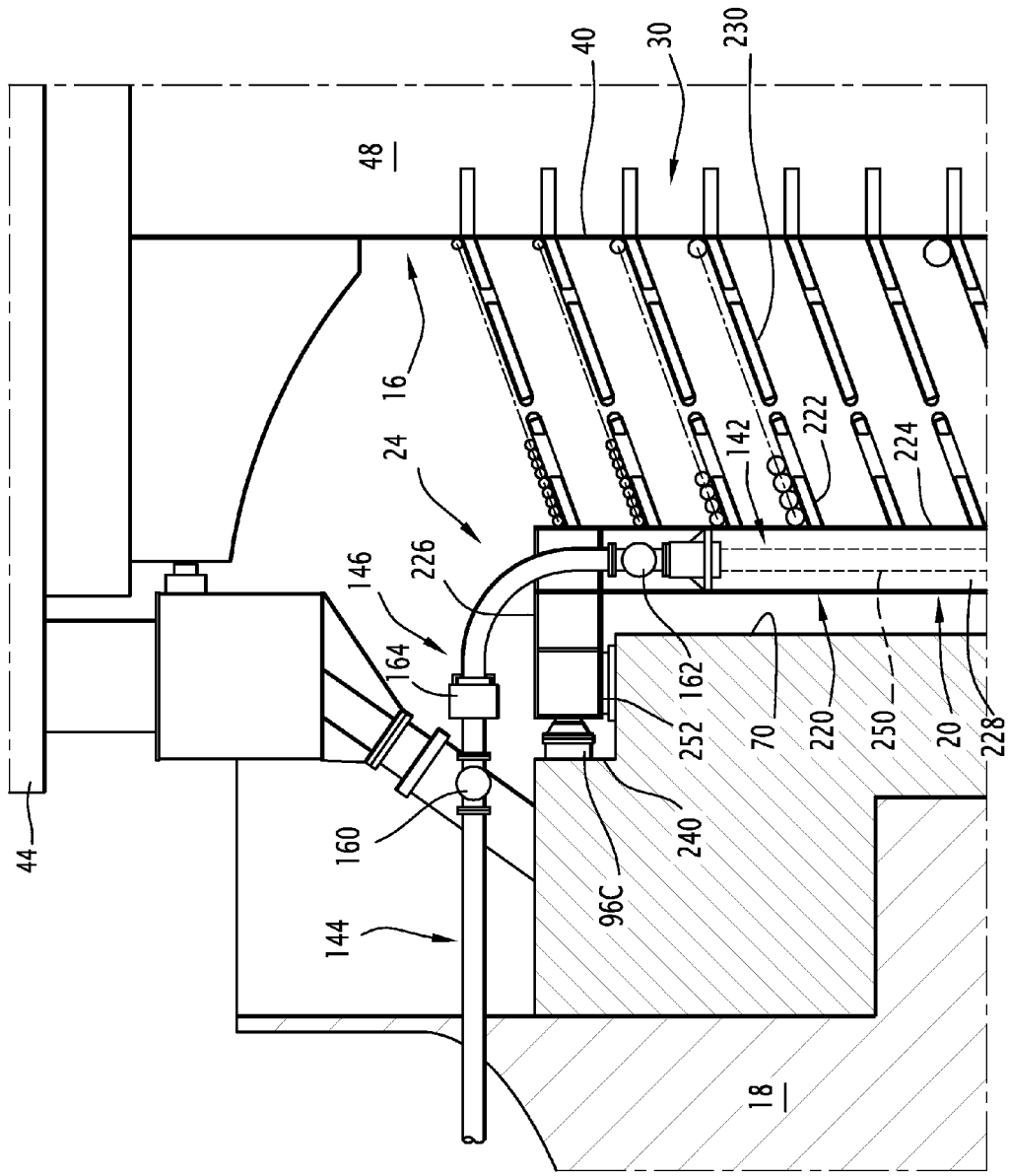
FIG. 7 is a view of a detail marked VII in FIG. 5, in the connection configuration.

To that end, as illustrated in FIG. 7, the upper isolating valve 160 is arranged at the upstream free end of the upper section 144 above the skirt 226 and the shoulder 240 and the lower isolating valve 162 is mounted on the downstream free end of the upper part 250 in the annular space 228.

The connector 164 is arranged above the skirt 226, between the valves 160, 162.

Unlike the device 10 shown in FIGS. 1 to 4, the intermediate structure 20 of the device 210 is in its driven configuration during fluid production, when the pipe 24 is connected.

Thus, the skirt 226 of the outer sleeve 220 rests under its own weight on a support 252 provided on the shoulder 240 delimited by the body.

In this configuration, the barge 18 and the intermediate structure 20 can be jointly rotated around the superstructure 16.

During this rotation, the supports 231 secured to the barge pivot around the axis A-A' under the skirt 44 via bearings.

The wound hose section 150 of each pipe 24 then winds and unwinds on the respective tapered walls 222, 230 between the inner end 152 that is stationary in rotation relative to the superstructure 16 and the outer end 154, which is secured in rotation with the barge 18.

Figure 8:
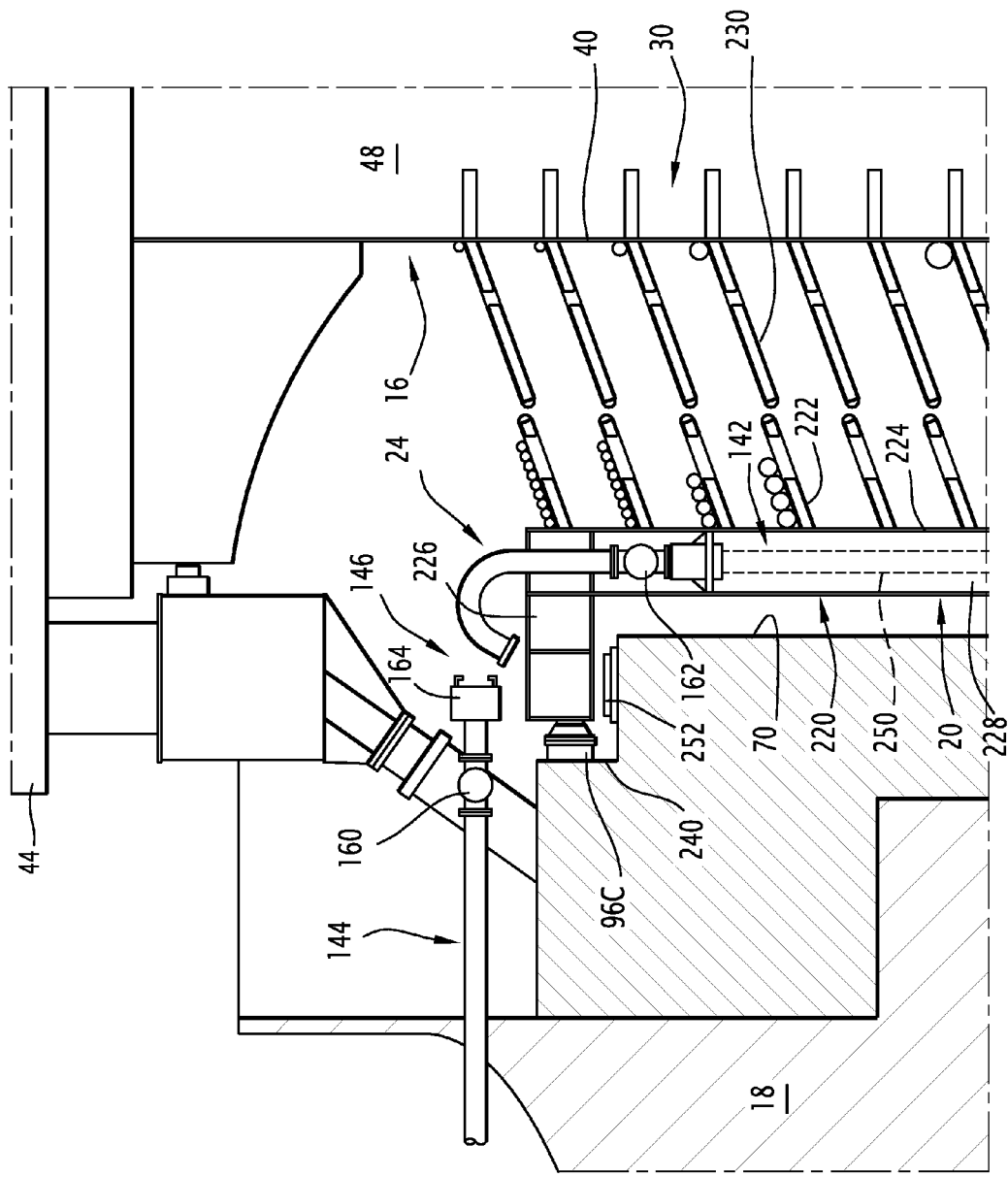
FIG. 8 is a view similar to FIG. 7 in a disconnection configuration.

In the event of an emergency disconnect, the connector 164 is disconnected as shown in FIG. 8, after closing the isolating valves 160, 162.

Each jack 124 secured to the superstructure 16 then lifts the sleeve 220 to translate it along axis A-A'. This disengages the intermediate structure 20 from the barge 18 and makes the intermediate structure 20 go from its driven configuration to its retained configuration.

In the retained configuration shown in FIG. 8, the sleeve 220 and its skirt 226 are placed completely spaced away from the barge 18 above the support 252 received in the shoulder 240. The barge 18 is therefore free to pivot under the intermediate structure 20 without driving it in rotation.

The intermediate structure 20 is on the other hand kept rotationally stationary relative to the superstructure 16. In this way, the outer end 154 of the hose section remains angularly stationary relative to the inner end 152.

The pipe 24 being cut at the disconnect device 146, the floating barge 18 is free to rotate around the superstructure 16 over very large angular displacements, in particular greater than one revolution, without altering the angular position of the outer end 154 of the wound hose section 150 in relation to the inner end 152 of that section and therefore the twisting of the wound hose section 150.

Figure 9:
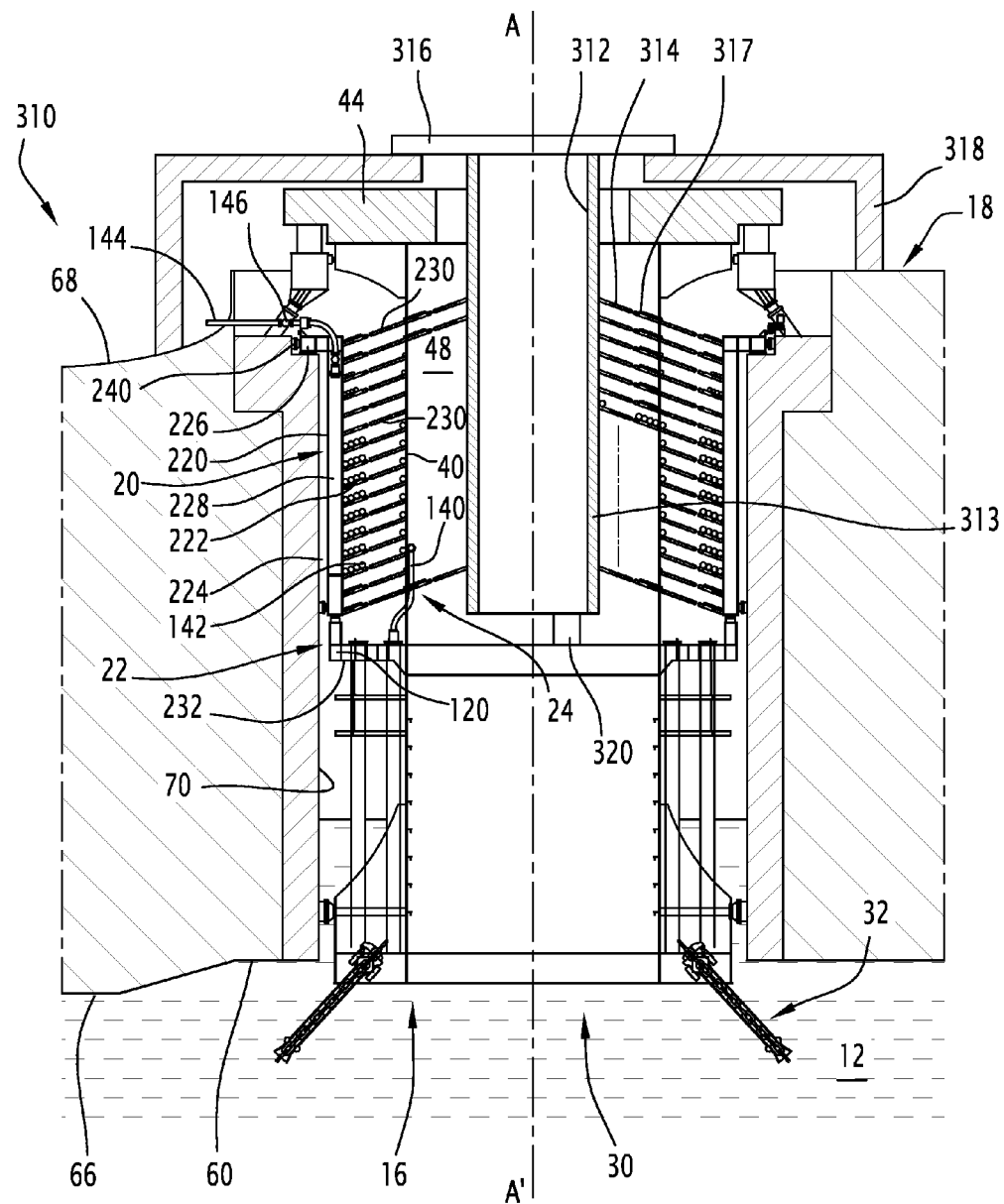
FIG. 9 is a view similar to FIG. 5 of a third transfer device according to the invention.

A third transport device 310 according to the invention is illustrated in FIG. 9. Unlike the second device 210, this third device 310 comprises an additional intermediate structure 312 for supporting hose sections 150 of an additional group of pipes 24.

The additional structure 312 comprises a tubular body 313 arranged in the passage 48 delimited in the center of the superstructure 16, a plurality of auxiliary tapered support walls 314, and an auxiliary bearing skirt 316 on an annular support 318 secured to the barge 18.

The body 313 extends along axis A-A' opposite the inner sleeve 40 of the superstructure 16.

Each auxiliary wall 314 protrudes from the body 313 towards the inner sleeve 40. Each wall 314 extends opposite a corresponding tapered support wall 317 secured to the inner surface of the sleeve 40.

Each auxiliary wall pair 314, 317 supports a hose section 150 of a pipe 24. As previously described, a first end of the hose section 150 is mounted secured to the body 313 and a second end of the hose section 150 is mounted secured to the sleeve 40.

The annular support 318 radially protrudes around and above the skirt 44 and the well 70. It is outwardly fixed on an upper surface of the barge 18.

The additional structure 312 can thus be translated along axis A-A' between a configuration driven in rotation by the barge 18, in which the skirt 316 rests on the support 318, and a configuration retained by the superstructure 16, in which the skirt 316 is arranged spaced away from the barge 18.

As previously described, a jack 320 supported by the superstructure is arranged under the tubular body 313 to move the additional structure 312 from its driven configuration to its retained configuration.

Thus, in the driven configuration, the ends of each hose section 150 supported by each pair of facing support walls 314, 317 are angularly movable relative to each other. In the retained configuration, the ends of each hose section 150 supported by each pair of facing support walls 314, 317 are angularly stationary relative to each other.

Advantageously, the superstructure 16 comprises two independent bodies 16', 16" mounted one on the other so that they can be released via known a securing means 600.

Figure 10:
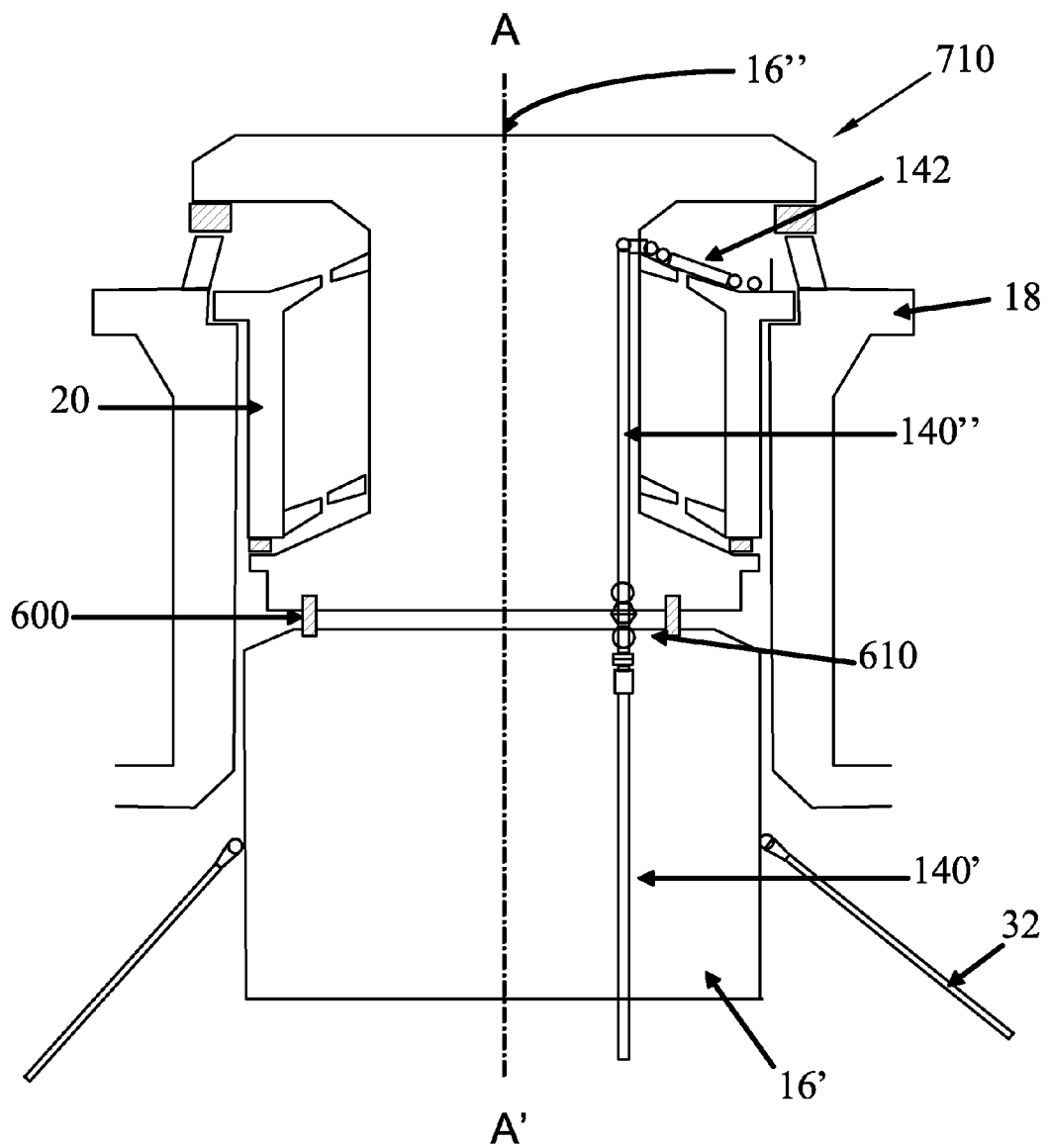
FIG. 10 is a diagrammatic view of the second transfer assembly according to the invention showing a detail of the superstructure according to a third embodiment.

FIG. 10 diagrammatically illustrates such a superstructure used with the transfer system according to the second embodiment of the invention. FIG. 10 shows a transfer device 710 comprising a superstructure 16 anchored on the sea bottom and a barge 18 rotatably mounted around the superstructure 16. FIG. 10 also shows the intermediate structure 20 forming a hollow outer cylindrical sleeve according to the embodiment shown in FIGS. 5 to 9.

The method for disconnecting the transfer device formed by an upper superstructure body 16", an intermediate structure 20, and a barge 18 operates similarly to the device previously described in reference to FIGS. 5 to 9. We will therefore only describe the particularities of the superstructure 16 here.

The superstructure 16 comprises a floating lower body 16'. Furthermore, this lower body can be disconnected from the upper body 16" of the superstructure, as will be explained below.

The lower body 16' of the superstructure is secured to the upper body 16" of the superstructure by a known securing means 600. This lower body 16' of the superstructure supports the mooring system 32 of the barge 18. Furthermore, in FIG.

10, the lower section 140 of the fluid transport pipe comprises a first part 140" passing through the upper body 16" of the superstructure in a direction A-A', vertical in FIG. 10, and a second part 140' passing through the lower body 16' of the superstructure in a direction A-A'. The two parts 140', 140" making up the lower superstructure 140 are connected by a disconnect system 610 arranged between the upper body 16" and the lower body 16'. The lower part 140' generally extends to the sea bottom.

The upper body 16" of the superstructure is provided with roller supports to ensure the rotation of the barge around the latter while the lower body 16' does not have its own roller support. In the normal operating mode, the lower body 16' of the superstructure is secured to the upper body 16" of the superstructure. In this way, the barge 18 can rotate around the two superstructure bodies 16' and 16" via roller supports of the upper body 16" of the superstructure.

Figure 11:
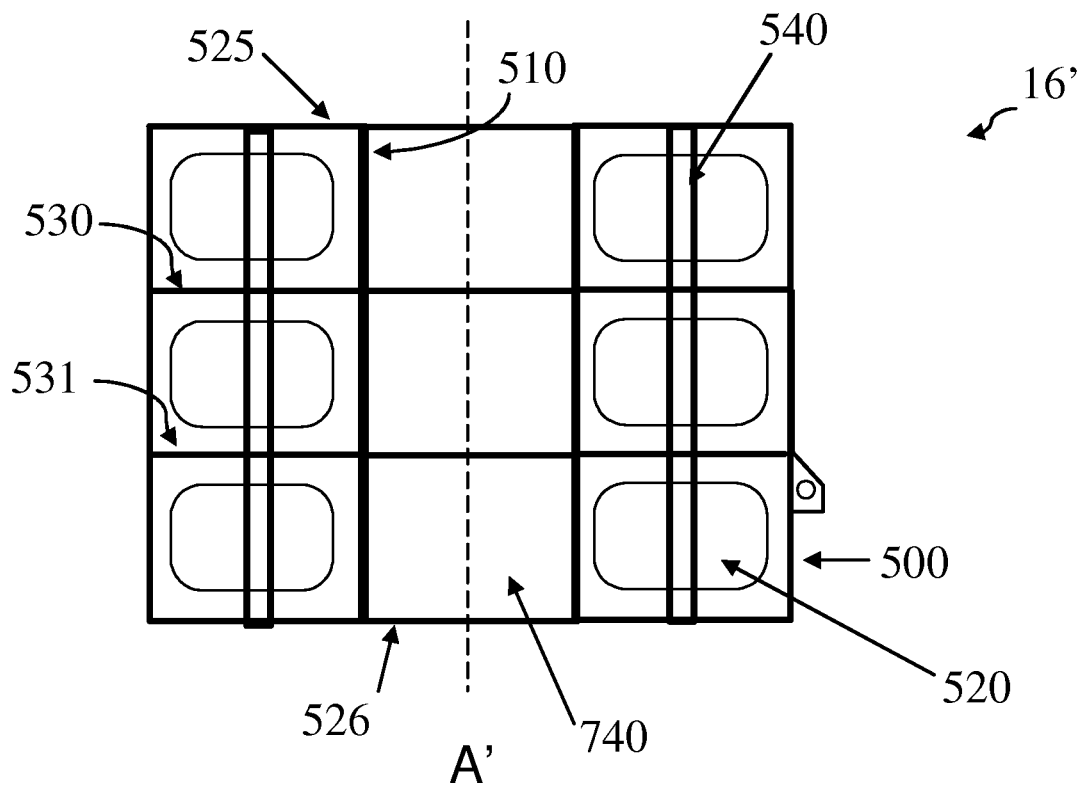
FIG. 11 is a detailed view of the lower part of the superstructure according to FIG. 10.

FIG. 11 is a detailed view of the lower superstructure body 16'. This lower body 16' has an outer wall 500 with axis A-A' forming a first outer section 500. A second hollow cylindrical sleeve 510 with a height along axis A-A' similar to the height of the outer sleeve 500 is arranged inside the first sleeve 500, thereby delimiting an annular space 520 between the two sleeves. The sleeves 510, 520 are closed with upper and lower walls 525, 526.

I tubes 540 with a large enough diameter to receive the lower parts 140' of the lower sections 140 are arranged in the annular space 520. The ends of the I tubes 540 emerge at the upper 525 and lower 526 walls each delimiting a circulation passage along the axial direction A-A'. These circulation passages are intended to receive the lower parts 140' of each lower section 140. They are distributed at regular intervals on the circumference of the annular space of the lower body 16'. These I tubes 540 also reinforce the structure of the lower body 16' of the structure.

Figure 12:
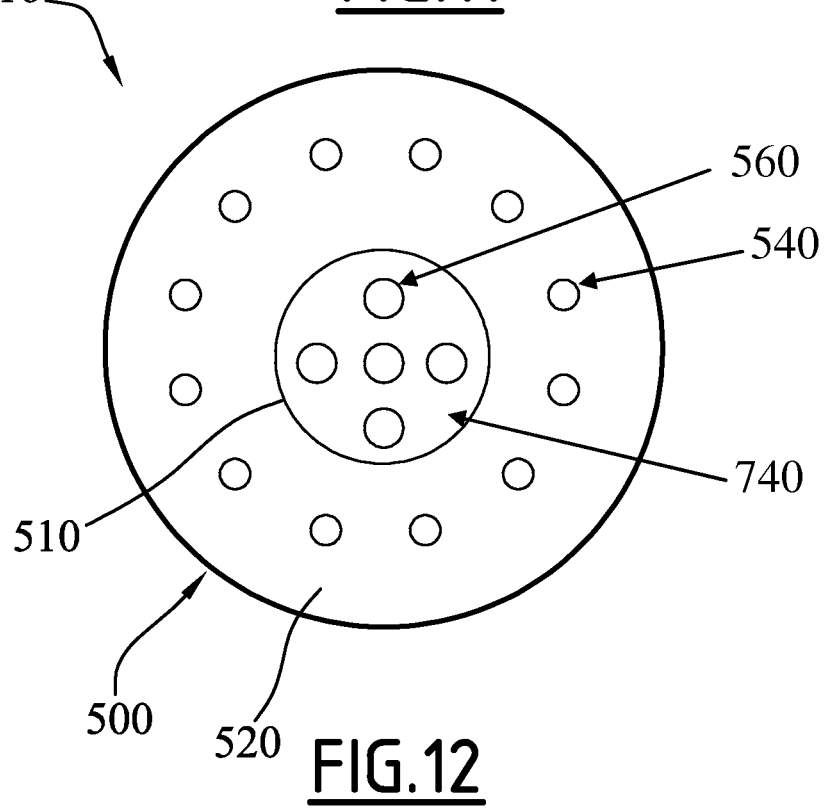
FIG. 12 is a cross-sectional view along a transverse plane of the lower part of the superstructure shown in FIG. 11.

FIG. 12 is a transverse cross-sectional view perpendicular to axis A-A' of the regular distribution of the I tubes 540 in the annular space 520.

Cross-pieces 530, 531 are arranged at intervals along axis A-A' in a plane perpendicular to axis A-A' dividing up the annular space 520 of the lower body 16' into different independent sealed compartments. Preferably, the compartments of the lower superstructure body 16' are provided with valves to control and adjust the buoyancy of the lower body 16' assembly.

Advantageously, the central annular space 740 can be used to install pipes 560 and underwater pumps in order to convey cold water to the surface of the barge 18 useful for cooling the equipment arranged on the barge 18. These pipes 560 can be made from a polymeric material and extend inside the central well 740 of the superstructure along axis A-A' between the surface of the barge and a depth of several tens of meters.

The method for disconnecting the lower body 16' supporting the lower parts 140' of the lower sections 140 will now be described. This step takes place after the step for disconnecting the intermediate section 142 and the lower section 140, allowing free rotation of the barge 18 around the superstructure 16 and which has been described above.

The disconnection of the lower body 16' is done as follows. First, the first part 140' and the second part 140" of the lower section 40 are isolated and disconnected by closing the valves of the disconnect system 610. Then, the lower body 16' of the superstructure is disconnected from the upper body 16" of the superstructure. The residual buoyancy of the lower body 16' of the superstructure in place then allows the latter to descend. If necessary, the lower body 16' of the superstructure is slightly ballasted to initiate the descent of the lower body 16'.

The lower body 16' of the superstructure is then stabilized at a depth substantially below the barge 18. To that end it is necessary to adjust the buoyancy of the lower body 16' so that it reaches and preserves its equilibrium position. The surface installation 18 can then be evacuated from the operation site.

It may be advantageous to evacuate the surface installation supporting the upper body 16" of the superstructure when the weather conditions are extreme or when the surface installation is required on another site.

Thus, disconnected from the upper body 16" of the superstructure, the lower body 16' of the superstructure advantageously constitutes an underground installation providing temporary support for the lower parts 140' of risers and an anchoring means 32 of the barge 18. These can then be recovered as will be described now.

According to still another advantageous usage method of the lower body 16' of the superstructure, the lower superstructure body 16' supports the lower parts 140' and the anchoring means of the barge 18, at a water depth of several tens of meters sufficient to prevent any collision with a surface installation. The surface installation or the barge 18 is then brought to overhang the lower body 16'. The buoyancy of the lower body 16' is then increased to cause the lower body 16' to rise towards the surface. Guide cables make it possible to guide the lower body 16' in its housing formed in the well of the surface installation 18 under the upper body 16" of the superstructure. The parts 140' and 140" of the lower section are then aligned by rotating the barge 18 around the superstructure, the upper body 16" being kept rotatably stationary relative to the barge 18. Then, the lower body 16' is secured to the upper body 16".

The superstructure shown in FIG. 10 is described in relation with the second transfer device according to the invention. However, it can be used with the first embodiment of the transfer device.

In the embodiment shown in FIGS. 5 to 8, the intermediate structure 20 is lifted owing to jacks to physically disconnect the intermediate structure 20 from the barge 18, such that the intermediate structure 220 is secured to the superstructure 16.

In one advantageous alternative, which prevents raising the intermediate structure 20, the vertical movement device 124 (formed by jacks) is replaced by rotation bearings (rollers or legs) on the surfaces 232 and 226 and by a suitable device for locking the rotation of the intermediate structure 20 relative to the superstructure 16, which makes it possible to secure the intermediate structure 20 to the superstructure 16 in the disconnected position without vertical movement of the intermediate structure 20 relative to the superstructure 16 or relative to the barge 18.

To prevent damaging the pipes once they are disconnected, their upper ends are kept taut, for example by jointly fastening them on an upper crown.

The invention claimed is:

1. A method for disconnecting a transfer device for transferring fluid between the bottom of an expanse of water and the surface, wherein the transfer device used in performance of the method includes:
   at least one fluid transport pipe including a lower section, an intermediate section, an upper section, and a quick disconnect member inserted between the intermediate section and either the lower section or the upper section;
   a superstructure supporting the lower section, the superstructure comprising an anchoring device for anchoring the superstructure in the bottom of the expanse of water;
   a floating barge rotatably mounted to rotate on the superstructure around an axis of rotation, the barge supporting the upper section of the pipe, the intermediate section comprising at least one flexible hose section wound around the axis of rotation, the transfer device comprises at least one intermediate structure for at least partial support of the wound flexible hose section, the intermediate structure being mounted between the superstructure and the barge, between a driven configuration driven in joint rotation with the barge around the axis of rotation relative to the superstructure and a retained configuration retained in rotation around the axis of rotation by the superstructure, the method including connecting the intermediate section to either the lower section or the upper section via the quick disconnect member, and disconnecting the quick disconnect member during the connection step, placing the intermediate structure in either the driven configuration or the retained configuration, the disconnection step comprising passing the intermediate structure towards the other of the driven configuration and the retained configuration.

2. The method according to claim 1, wherein the intermediate structure comprises a wall for supporting the wound hose section extending around the axis of rotation, and the connection step comprises winding or unwinding of the wound hose section on the support wall around the axis of rotation during the rotation of the barge relative to the superstructure.

3. The method according to claim 1, wherein the disconnection step comprises translating the intermediate structure along the axis of rotation for causing the intermediate structure to go from one of its driven configuration and its retained configuration towards the other of said driven configuration and retained configuration.

4. The method according to claim 1, wherein during the connection step, retaining the intermediate structure in its retained configuration.

5. The method according to claim 1, wherein during the connection step, the intermediate structure is in its driven configuration.

6. The method according to claim 1, wherein after the disconnection step, mounting the barge freely rotating around the superstructure, and the ends of the wound flexible hose section remaining substantially angularly fixed relative to each other around the axis of rotation.

7. A transfer device for transferring fluid between the bottom of an expanse of water and the surface, the device comprising:
- at least one fluid transport pipe including a lower section, an intermediate section, an upper section, and a quick disconnect member inserted between the intermediate section and either the lower section or the upper section,
- a superstructure supporting the lower section, the superstructure comprising an anchoring device for anchoring the superstructure in the bottom of the expanse of water;
- a floating barge, rotatably mounted to rotate on the superstructure around an axis of rotation, the barge supporting the upper section,
- the intermediate section comprising at least one flexible hose section wound around the axis of rotation,
- the transport pipe having a connected configuration in which the intermediate section is connected to one of the lower section and the upper section via the quick disconnect member, and having a disconnection configuration of the quick disconnect member,
- the transfer device comprising an intermediate structure at least partially supporting the wound flexible hose section, the intermediate structure being mounted between the superstructure and the barge, between a configuration driven in joint rotation with the barge around the axis of rotation relative to the superstructure and a configuration retained in rotation around the axis of rotation by the superstructure.

8. The device according to claim 7, wherein the intermediate structure comprises a wall for supporting the wound flexible hose section extending around the axis of rotation, such that the wound hose section is at least partially arranged on the support wall.

9. The device according to claim 8, further comprising a plurality of the fluid transport pipes, the intermediate structure comprising a wall for supporting a respective wound flexible hose section of each transport pipe, the support walls being arranged one above the other along the axis of rotation.

10. The device according to claim 7, wherein the connected configuration of the pipe, the intermediate structure occupies its driven configuration.

11. The device according to claim 7, wherein in the connected configuration of the pipe, the intermediate structure occupies its retained configuration.

12. The assembly according to claim 11, further comprising a device for adjusting the angular position of the intermediate structure relative to the superstructure in the retained configuration.

13. The device according to claim 7, wherein in a first one of the driven configuration and the retained configuration, the ends of the wound flexible hose section are angularly mobile relative to each other around the axis of rotation when the barge rotates around the superstructure, and in a second one of the driven configuration and the retained configuration, the ends of the wound flexible hose section remain substantially angularly fixed relative to each other around the axis of rotation during rotation of the barge around the superstructure.

14. The device according to claim 7 comprising an intermediate structure for at least partially supporting a wound flexible hose section of an additional transport pipe, the additional intermediate structure being mounted between the superstructure and the barge, between a configuration driven in joint rotation with the barge around the axis of rotation and a configuration retained in rotation around the axis of rotation by the superstructure, the intermediate structure being arranged outside the superstructure, and the additional intermediate structure being arranged in the superstructure.

15. The device according to claim 7, wherein the superstructure comprises an upper body and a lower body, wherein the upper body and the lower body are mounted one on the other so that they can be released, the lower body comprising a first part and a second part connected by a disconnect member.

16. The device according to claim 15, wherein the lower superstructure body supports the anchoring device of the barge.

* * * * *